United States Patent Office.

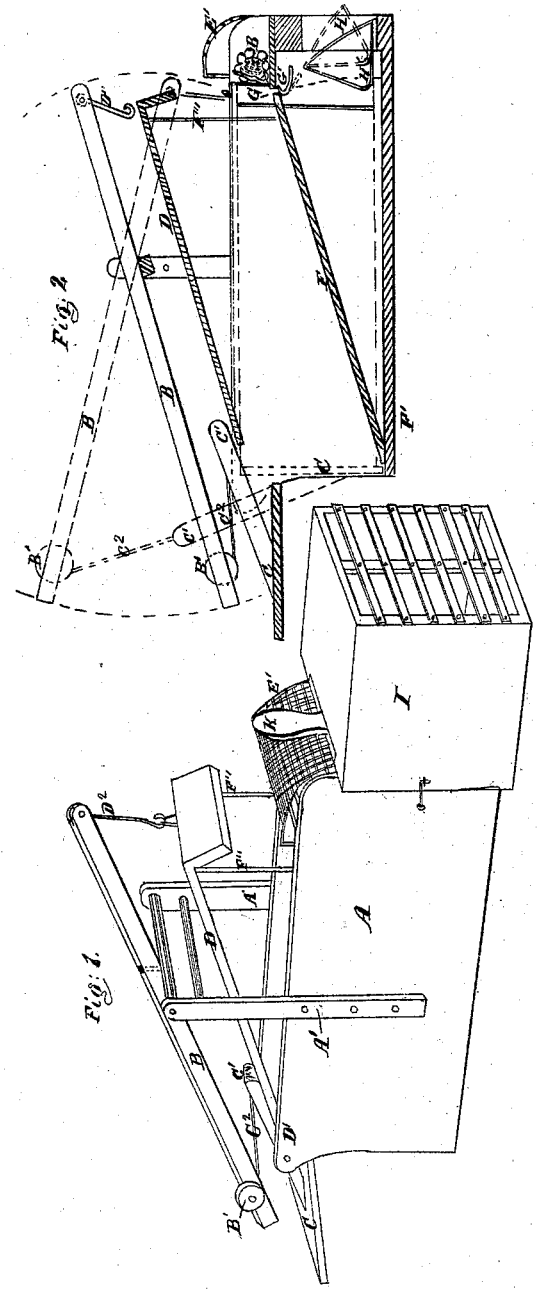

SETH HOKE, OF UNION CITY, INDIANA, ASSIGNOR TO HIMSELF AND VAL. THOMPSON, OF SAME PLACE.

Letters Patent No. 70,336, dated October 29, 1867.

IMPROVED ANIMAL TRAP.

*The Schedule referred to in these Letters Patent and making part of the same.*

TO ALL WHOM IT MAY CONCERN:

Be it known that I, SETH HOKE, of Union City, in the county of Randolph, and State of Indiana, have invented a new and useful Improvement in Animal Traps; and I do hereby declare that the following is a full, clear, and exact description of the same, reference being had to the annexed drawings, making part of this specification, in which—

Figure 1 is a perspective view, and

Figure 2 is a vertical longitudinal section.

The same letters are employed in both figures in the indication of identical parts.

A is the body of the trap, into which the rat or other animal enters, passing under the door C. Standards, A', are attached on each side of the box A, forming bearings for the roller, to which the lever B is attached. B' is a weight, attached to the end of the lever, sufficient to bear down the end of the lever and set the trap in the manner to be hereinafter described. C is a door, hinged to the box A by a roller attached to the arm $C^1$, which is connected by the rod $C^2$ with the lever B in such manner as to close and open the door with the oscillation of the lever. D is another door, hinged to the box A at $D^1$, and forming the top of the box. This door is connected with the upper end of the lever B by a rod, $D^2$. E is the bait-box, placed in the end of the box A opposite to the entrance, and covered by a wire screen, E', on the back, but open toward the interior of the box. F is a floor, hinged to the bottom of the box at $F^1$, which, when the trap is set, forms an inclined plane rising from the door C to the bait-box. The front of the bait-box is covered partly by an oscillating frame hinged to the sides of the box below, to which is attached the trigger G', which is curved, as shown in fig. 2, so as to support the upper end of the inclined floor F when the trap is set. When the frame G is pressed back by the animal in attempting to get at the bait, the hook G' is carried from under the floor F, and it will fall by the weight of the animal resting on it. This floor is connected by the rods $F^2$ with the door D, and in falling it will draw down the door, and with it, through the rod $D^2$, the upper end of the lever B, thereby, at the same time, closing the door C, and confining the animal in the box A. H is an inclined door of wires, hinged to the box A on each side, and covering an opening made through the end of the box below the bait-box E. This door has an angular rod, H', attached to its upper and lower ends, and bent in such form that, as the floor descends, it will give way and allow the end of the floor to fall to the bottom of the box, when the weight of the door H will cause the elbow of the rod H' to rest upon the floor, holding it down, and keeping all parts of the trap closed. The animal may pass out of the box A under the door H, and in doing so will disengage the floor F by raising from it the elbow H'. The weight B', acting upon the lever B, will now cause the end of the same to descend, thereby opening the door C, and, through the rod $D^2$, raising the door D, and, through the rods $F^2$, the floor F, which, in rising, will pass over the angle in the trigger G', and the trap be again automatically set. The animal, on passing out of the box A under the door H, will enter the cage I, which is covered by bars on the rear end, so as to admit the light, and thereby attract the animal into the cage, on entering which the door H will be closed by gravity behind it, leaving it a prisoner in the cage I. The cage is attached by hooks to the box A, and has a sliding door, K, closing the entrance, which stands open when the trap is in use, but which may be closed before the cage is detached.

What I claim as my invention, and desire to secure by Letters Patent, is—

1. In combination with the box A and doors C and D, the lever B, hinged floor F, and connecting-rods $F^2$ and $D^2$, substantially as set forth.

2. The arrangement of the box A, bait-box E, oscillating frame G, and trigger G', doors C and D, lever B, and connecting-rods $D^2$ and $F^2$, substantially as described.

3. The combination of the hinged floor F, door H, and the angular rod H' attached to the latter, with the doors C and D, and weighted lever B for setting the trap automatically, substantially as set forth.

4. The arrangement of the cage I, having a sliding door, K, in connection with the box A, having the parts for setting the trap automatically, upon the passage of the animal from the box, substantially as set forth.

In testimony whereof I have signed my name to this specification in the presence of two subscribing witnesses.

SETH HOKE.

Witnesses:
A. J. HARRIS,
JAMES S. TILLSON.